United States Patent

[11] 3,592,960

[72] Inventors Richard W. Cushing
Forest Park;
John Logeman, IV, Park Ridge, Ill.; Paul J. Whiteneir, Jr., Fort Wayne, Ind.
[21] Appl. No. 732,307
[22] Filed May 27, 1968
[45] Patented July 13, 1971
[73] Assignee Warwick Electronics Inc.

[54] AUTOMATIC FREQUENCY CONTROL FOR AN OSCILLATOR IN A CHROMA DEMODULATION CIRCUIT

9 Claims, 4 Drawing Figs.

[52] U.S. Cl. 178/5.4 SD, 331/8, 331/20, 331/116
[51] Int. Cl. H04n 9/50
[50] Field of Search 178/5.4 SD, 5.4 SY, 69.5 CB; 317/235.22; 331/8, 20, 116, 173, 177

[56] References Cited

UNITED STATES PATENTS

| | | | |
|---|---|---|---|
| 2,588,551 | 3/1952 | McCoy | 332/29 |
| 2,925,561 | 2/1960 | MacDonald | 332/26 |
| 3,502,796 | 3/1970 | Hambley | 178/5.4 SD |
| 3,163,831 | 12/1964 | Fischman et al. | 331/173 |
| 3,319,179 | 5/1967 | Hepner | 331/8 |
| 3,378,790 | 4/1968 | Bray | 317/235.22 |
| 3,466,386 | 9/1969 | Dias et al. | 178/5.4 SD |

*Primary Examiner*—Robert L. Griffin
*Assistant Examiner*—Donald E. Stout
*Attorneys*—Charles M. Carter and Kenneth W. Hadland

ABSTRACT: In the chroma channel of a color television receiver, a demodulator circuit for the chroma subcarrier component and an oscillator circuit for producing a control signal having the frequency and phase of the chroma subcarrier component, wherein the demodulator circuit and the oscillator circuit except for the resonant circuit portion thereof have been designed to be capable of incorporation in an integrated circuit on a single wafer of semiconductor material.

INVENTORS
RICHARD W. CUSHING
JOHN LOGEMAN IV
PAUL J. WHITENEIR, JR.

by: Charles W. Carter ATTY.

INVENTORS
RICHARD W. CUSHING
JOHN LOGEMAN IV
PAUL J. WHITENEIR, JR.
by: Charles W. Patter ATTY.

INVENTORS
RICHARD W. CUSHING
JOHN LOGEMAN IV
PAUL J. WHITENEIR, JR.
by: Charles W. Carter ATTY.

AUTOMATIC FREQUENCY CONTROL FOR AN OSCILLATOR IN A CHROMA DEMODULATION CIRCUIT

BACKGROUND OF INVENTION

1. Field of Invention

Present day color television receivers utilize a color television signal in which brightness or luminance information is transmitted as an amplitude modulation of a picture carrier and chroma information is transmitted as a modulation of a chroma subcarrier which, in turn, is modulated on the picture carrier. Additionally, the composite signal includes a reference signal component or color burst signal having a frequency and phase bearing a predetermined relation to the subcarrier component.

The chroma channel of such receivers includes a first network for deriving the chroma subcarrier component from the composite television signal and a second network including an oscillator circuit for deriving the reference signal component from the composite signal and for producing a sinusoidal control signal having the frequency and phase of the chroma subcarrier component in response to the reference signal component. A demodulator is provided for producing desired color signals responsive to the application thereto of the chroma subcarrier component and the sinusoidal control signal. The color signals are applied through appropriate circuitry to the color picture tube.

With the advent of integrated circuits, it is desirable to provide oscillator and demodulator circuitry for use in the chroma channel which lends itself to incorporation on a single wafer of semiconductor material. Additionally, it has been desirable to provide new and improved oscillator circuitry and demodulator circuitry which independently may be incorporated in integrated circuits.

2. Description of Prior Art

In conventional prior art circuits, electron tubes have been employed in the oscillator and demodulator circuits which do not lend themselves to incorporation in integrated circuits. Typical circuitry is found in the book "Color Television Fundamentals" by Milton S. Kiver, the Second Edition of which was printed and copyrighted in 1964 by McGraw-Hill Inc. In more recent times, steps have been taken toward transistorization of color television receivers. While transistors lend themselves to integration on a monolithic semiconductor device, the mere fact that a circuit employs transistors does not means that the circuit can be practically integrated. Various factors must be considered regarding the incorporation of circuitry on a monolithic semiconductor device which limits the circuitry that can be integrated and has ruled out integration of conventional oscillator and demodulator circuitry employed in transistorized color receivers. In integrated circuits, because of economic limitations, component ranges are not as wide and tolerances are worse than with conventional discreet components. For example, resistors are economically limited to the range of 25—30 ohms to 25—30 K ohms and capacitors are economically limited to maximum values of approximately 10 picofarads. Additionally, inductors can not be integrated, voltage levels are limited which places limitations on circuit components such as transistors, the number of terminals are limited by the packaging arrangement, power dissipation is limited by packaging, components such as resistors and capacitors have nonlinear characteristics, and voltage limitations exist with parasitic components.

Accordingly, while it has been desirable to integrate portions of color television receivers, conventional circuitry does not lend itself to integration because of the limitations which accompany integration.

BRIEF SUMMARY OF INVENTION

The present invention is directed, generally, to new and improved oscillator and demodulator circuitry for use in the chroma channel of a color television receiver which lends itself to incorporation in an integrated circuit on a single wafer of semiconductor material. Additionally, the present invention is directed to a novel oscillator circuit and to a novel demodulator circuit which lend themselves to independent integration as well as to combined integration.

The oscillator circuit of the present invention includes an active element which may be in the form of a transistor. A resonant circuit is provided for determining the oscillator frequency by the average capacitance thereof which, in the exemplary arrangement, includes an auxiliary capacitor. A switch member, which may be in the form of a diode, is associated with the capacitor and is alternately operative to render the capacitor electrically in the resonant circuit and to short circuit the capacitor. A constant current source, which may be in the form of a transistor, is associated with the switch member and responds to a control signal to control the duty cycle of the switch member to determine the average capacitance of the resonant circuit. The elements of the oscillator except for the resonant circuit may be incorporated in an integrated circuit on a monolithic semiconductor device.

The demodulator circuit of the present invention includes at least a pair of current control devices, which may be in the form of transistors, to which the chroma subcarrier component is supplied and includes circuitry, which may include a transistor associated with each current control device, for converting the sinusoidal control signal derived from the reference component signal into a square wave signal which is applied to the current control devices. The current control devices and the wave converting circuitry may likewise be incorporated in an integrated circuit on a monolithic semiconductor device.

DESCRIPTION OF THE PREFERRED EMBODIMENT

While the present invention will be described in accordance with a preferred embodiment, it is to be understood that the invention is not to be limited thereto but, on the contrary, is intended to cover the various modifications and equivalent arrangements included within the spirit and scope of the invention as defined by the appended claims.

Figure 1:
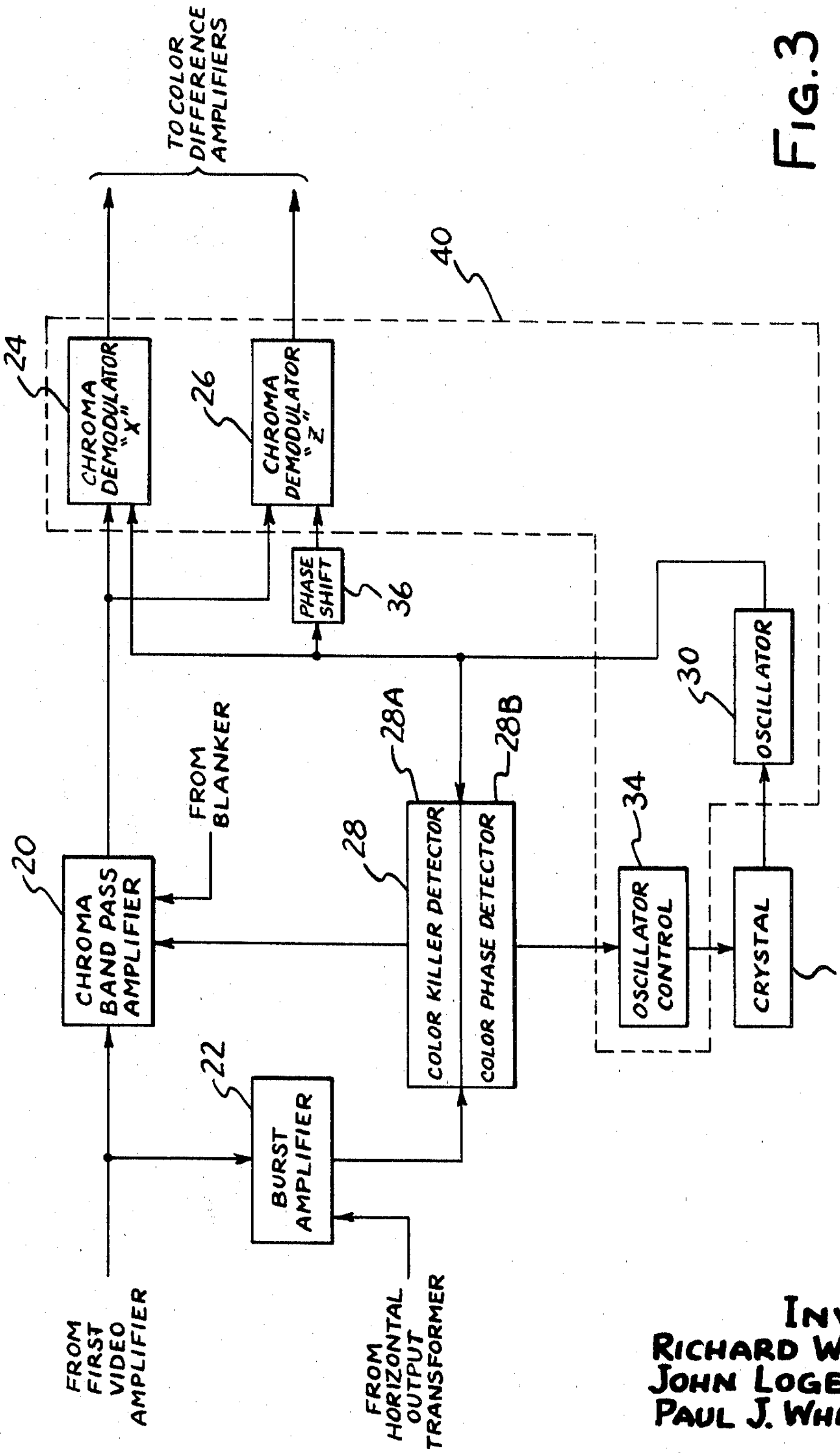
FIG. 1 is a block diagram of a portion of a conventional color television circuit which embodies the circuitry of the present invention.

Referring to FIG. 1, a portion of a color television receiver circuit, which embodies the present invention, is shown in block diagram form. More specifically, chroma channel circuitry of a color television receiver is shown which functions to extract the color sidebands of the video signal, to attenuate all the remaining portions of the signal and to demodulate the color signals.

A portion of the total video signal is obtained from the first video amplifier (not shown) and is transmitted to a chroma band-pass amplifier 20 and to a burst amplifier 22. The chroma band-pass amplifier network 20 includes a filtering arrangement so that the color information of the video signal is passed thereby and is transmitted to chroma demodulators 24, 26 whereas signals below approximately 2.1 mc. and above approximately 4.5 mc. are eliminated. Thus, the monochrome information of the video signal is eliminated. The burst information of the video signal which is found on the back porch of each horizontal sync pulse is amplified by the burst amplifier 22 and is transmitted to color phase detector and color killer detector circuitry 28. For the purpose of cutting off the chroma band-pass amplifier while burst information is received, a cut off pulse is applied to the amplifier from a blanker (not shown) during the retrace period. This prevents color burst from reaching the demodulators and producing a yellow haze over the picture.

The burst amplifier 22 is rendered operative by a pulse produced in, for example, the horizontal output transformer during retrace. When color burst is not present indicating no color information, the color killer 28A functions to cutoff the band-pass amplifier 20. Conversely, when color information is present, the amplified burst information is transmitted to the color killer detector 28A rendering it inoperative.

The color phase detector 28B functions to compare and detect any frequency and phase differences between the color burst information supplied thereto from the burst amplifier 22 and a signal generated by a 3.58 mc. oscillator 30. The phase detector produces a difference output which is applied to an oscillator control circuit 34. The control circuit 34 functions to maintain the oscillator frequency and phase in line with the received color burst. The output of the oscillator 30 is also transmitted to the demodulators 24 and 26. The oscillator output is transmitted to demodulators 24, 26 with a phase difference therebetween as determined by a phase shift network 36.

The demodulators 24,26 function responsive to the simultaneous application thereto of the chroma information and the oscillator output to recreate the original color difference signals produced at the transmitter. The color difference signals are transmitted to a matrix (not shown) which includes color difference amplifiers for application to the picture tube (not shown). The color difference signals are recreated by the beating of the oscillator output with the color information sidebands. The oscillator 30 is designed to produce an output of the same frequency and phase as the color subcarrier, i.e. 3.58 mc. The phase shift network 36 is required to cause each color demodulator to function on the color axis upon which desired color information was impressed on the color subcarriers at the transmission station.

The operation of the television receiver of FIG. 1 as described to this point corresponds to the operation for present conventional receivers. In this regard, reference may be made to the previously referred to book "Color Television Fundamentals."

In accordance with one aspect of the present invention, portions of the receiver circuitry of FIG. 1, encompassed by the dotted line 40 in the exemplary arrangement, are incorporated in an integrated circuit. More specifically, the demodulators 24,26, the oscillator 30 and the oscillator control 34 are designed to be incorporated as an integrated circuit on a single wafer of semiconductor material.

Figure 2:
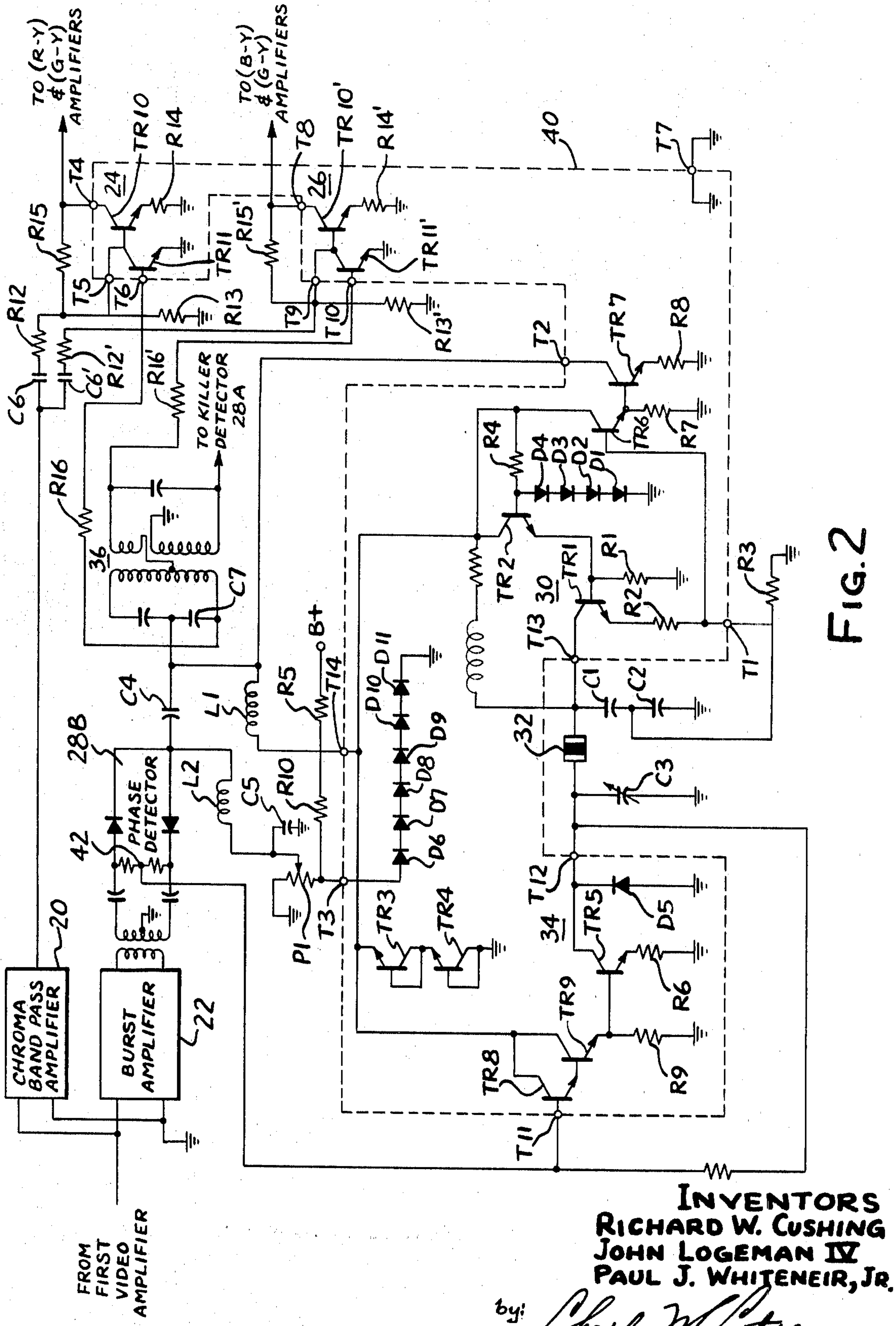
FIG. 2 is a schematic diagram illustrating the oscillator and demodulator circuitry constructed in accordance with the present invention.

Referring to FIG. 2, portions of the color television circuitry of FIG. 1, particularly the integrated circuit portion, are shown in schematic form. In accordance with another aspect of the present invention, a new and improved oscillator circuit is provided for producing a desired output. With the present color television environment, the oscillator circuit is designed to produce a 3.58 mc. output. In keeping with this aspect of the invention, the oscillator circuit has been designed to lend itself to integration on a single wafer of semiconductor material.

The oscillator 30 itself is in the form of a crystal controlled Clapp oscillator. In the exemplary arrangement the oscillator includes an active element TR1, shown in the form of an NPN transistor. The base of transistor TR1 is connected to ground through a bias resistor R1, the emitter is connected to ground through series resistors R2,R3 and the collector is connected to ground through series capacitors C1,C2. The junctions of resistors R2,R3 and capacitors C1,C2 are connected together to provide a feedback path. The collector of transistor TR1 is also connected to ground through the series combination of the crystal 32 and an auxiliary, variable capacitor C3. An emitter follower transistor TR2 is associated with the base bias resistor R1 for developing a desired base bias for the transistor TR1. The emitter of transistor TR2 is connected directly to the base of transistor TR1, the base is connected to ground through diodes D1—D4 and to the collector through voltage dividing resistor R4, and the collector is connected to a regulated voltage supply consisting of transistors TR3,TR4 which, in the schematic diagram, have their base and collector terminals connected together and which have their emitter-collector circuits connected in series. Transistors TR3,TR4 are supplied by a voltage source B+ through a voltage dropping resistor R5. Transistors TR3,TR4 function as Zener diodes and produce a desired regulated voltage thereacross. The diodes D1—D4 are biased to provide sufficient voltage for the transistors TR1,TR2 and for output stages associated therewith. The transistor TR2 is biased to have a low output impedance at the emitter so that substantially no AC signal is present at the base of the oscillator transistor TR1.

In essence, the oscillator circuit includes transistor TR1, resistors R2 and R3, capacitors C1 and C2, the crystal 32 and the variable capacitor C3. The exemplary oscillator functions as a conventional crystal controlled Clapp oscillator. Accordingly, the details of operation thereof will not be set forth. Briefly speaking, the oscillator circuit functions to produce an output across resistor R3 having a frequency determined by the resonant circuit. In the exemplary arrangement, the resonant circuit includes the crystal 32, operative in a series resonant mode, and the variable capacitor C3. Accordingly, the oscillator frequency is determined by the combined effect of the crystal 32 and the capacitor C3. The frequency of the oscillator 30 may be altered by changing the combined capacitance of the crystal 32 and the capacitor C3. In the exemplary arrangement, this may be accomplished by alternately short-circuiting and unshorting the capacitor C3. A typical prior art arrangement for accomplishing this function is shown in Fischman et al. U.S. Letters Patent No. 3,163,831.

In accordance with the present invention, a new and improved circuit arrangement is provided for alternately short-circuiting and unshorting the capacitor C3. More specifically, a switch device is connected in parallel with the capacitor C3 for alternately short-circuiting and unshorting the capacitor and a constant current source is associated with the switch device for controlling the duty cycle of the switch device in accordance with the application thereto of a control signal so that the average capacitance of the resonant circuit and thus the oscillator frequency is dependent upon the control signal.

In the exemplary arrangement, the switch device is shown in the form of a diode D5 which is connected in parallel with the capacitor C3 and the constant current source is shown in the form of an NPN transistor TR5 which has its emitter connected to ground through a resistor R6 and has its collector to ground output circuit connected in parallel with the diode D5 and with the capacitor C3. The oscillator develops an alternating signal at the junction of the collector of the transistor TR5 and the cathode of diode D5 which causes the transistor to be alternately conductive and nonconductive with proper base bias. The diode D5 functions as a peak rectifier developing a charge on capacitor C3. When diode D5 is not conducting, the capacitor is shunted by the diode leakage and when the diode D5 is conducting, the capacitor C3 is short circuited thereby. When the transistor TR5 is conductive, it bleeds off charge from the capacitor C3 depending upon the magnitude of the control signal applied to its base. It follows that the duty cycle of diode D5 is dependent upon the amount of charge bled off occurring during conduction of transistor TR5 which in turn is dependent upon the magnitude of the control signal applied to the base of transistor TR5. Accordingly, the average capacitance of the resonant circuit and thus the oscillator frequency is dependent upon the magnitude of the control signal. When the crystal and the capacitor are effectively in series, the oscillator has a high frequency. Conversely, when the capacitor is short circuited the oscillator has a low frequency. The steady state frequency of the oscillator at any instant is determined by the average capacitance value. Since the capacitor C3 is variable it permits setting the high end of the oscillator frequency with negligible effect on the low end frequency.

As is conventional in such television circuitry, the output of oscillator 30 is transmitted to one side of the phase detector 28B, which is shown in conventional form, and the color burst is applied to the other side of the phase detector. The phase detector develops a control signal at terminal 42 which is representative of differences in phase and frequency between the oscillator output and the color burst. The control signal so developed is used to control the operation of transistor TR5 so that the oscillator frequency is controlled to make its phase and frequency correspond to the burst phase and frequency. Since the phase detector circuit 28B is shown in conventional form, the details thereof will not be set forth.

In the exemplary arrangement, the oscillator output developed across resistor R3 is applied to the control electrode (base) of a driver TR6, shown in the form of an NPN transistor, which controls the operation of an oscillator output amplifier TR7. The output amplifier is connected to one side of the phase detector 28B through a capacitor C4. The collector of driver transistor TR6 is connected to the regulated voltage supply TR3,TR4 and the emitter is connected to ground through a resistor R7. The base of output amplifier transistor TR7 is connected to the emitter of transistor TR6 so that operation thereof is controlled by the voltage developed across resistor R7, the collector is connected to one side of the phase detector 28B through the capacitor C4 and is also connected to the regulated voltage supply TR3,TR4 through a choke L1, and the emitter is connected to ground through a resistor R8. The driver transistor TR6 responds to the oscillator output to produce a drive for the output amplifier transistor TR7 across resistor R7. The driver transistor TR6 functions to isolate transistor TR7 from the oscillator and provides current gain. The output amplifier in combination with the tuned primary circuit of transformer 36 transistor TR7 functions in combination with the tune primary circuit of transformer 36 as a tuned output power amplifier and applies a sinusoidal signal to the phase detector which corresponds to the oscillator output. Amplifier TR7 is biased such that substantially no current flows absent an input signal and preferably such that collector current is produced only during substantially less than 180° of the input signal. It should be clear however that Class "B" operation, although less efficient than Class "C" operation, can also be used for this amplifier stage without effecting the overall circuit operation. Class "C" is the preferred operation however as it reduces dissipation in the integrated chip.

The phase detector output developed at terminal 42 is applied to the oscillator control transistor TR5 through an impedance matching, driver arrangement. The phase detector output is applied to the control electrode (base) of an impedance matching driver TR8, shown in the form of an NPN transistor, which has a high input impedance for desired impedance matching. The collector of transistor TR8 is connected to the regulated voltage supply TR3,TR4 and the emitter is connected to the control electrode (base) of a second driver TR9, likewise shown in the form of an NPN transistor. The collector of transistor TR9 is also connected to the regulated voltage supply TR3,TR4 and the emitter is connected to the base of the oscillator control transistor TR5 and to ground through a resistor R9. The transistor TR9 functions as an emitter follower and provides a voltage source to drive the input of transistor TR5. The control voltage for transistor TR5, which is dependent upon the phase detector output, is developed across resistor R9 so that transistor TR5 controls the duty cycle of the diode switch D5 to control the oscillator output in accordance with the phase detector output.

In the disclosed arrangement, the oscillator input side of the phase detector 28B has a DC potential applied thereto so that the base of transistor TR8 is biased at a predetermined DC level. As may be seen, the voltage source B+ is connected to the phase detector through the series arrangement of resistor R5, a resistor R10, a potentiometer P1 and a choke L2. The potentiometer P1 allows for adjusting the bias level as discussed hereinafter. The tap of the potentiometer is bypassed to ground by a capacitor C5. For the purpose of regulating the bias, a string of diodes D6—D11 is connected in shunt with the potentiometer P1.

In operation, the phase detector 28B compares the oscillator output with the color burst. Unwanted signals are bypassed to ground by a capacitor C8 which is connected between terminal 42 and ground. If the phase and frequency thereof correspond, the standard DC bias is applied to transistor TR8 which drives transistor TR9 so that a standard bias is applied to transistor TR5. Responsive thereto transistor TR5 controls the duty cycle of diode switch D5 so that the oscillator output remains the same. If the phase and frequency of the oscillator and the burst do not correspond, the phase detector output varies so that the bias for transistor TR5 developed across resistor R9 is varied correspondingly. As a result, transistor TR5 functions to bleed more or less charge off capacitor C3 so that the duty cycle of the switch diode D5 is altered and the oscillator frequency is modified to correspond to the color burst.

For the purpose of stabilizing the operation of the oscillator control circuitry, a negative feedback path is provided from the collector of transistor TR5 to the base of transistor TR8. In the disclosed arrangement, the collector of transistor TR5 is connected to the base of transistor TR8 through a resistor R11.

In accordance with a further aspect of the present invention, new and improved demodulators 24,26 are provided for recreating the original color difference signals responsive to the simultaneous application thereto of chroma information and the oscillator output. More specifically, each demodulator includes a current control device having amplification characteristics to which the chroma information is applied and a device for converting the sinusoidal output of the oscillator into a periodic constant area switching signal, such as a square wave signal, which is also applied to the current control device. The demodulators of the present invention are designed to lend themselves to integration on a single wafer of semiconductor material. Since the demodulators are similar, only demodulator 24 will be discussed in detail. Corresponding numbers will be given to the elements of and associated with the demodulators 24,26 with the elements of and associated with demodulator 26 having prime (') designations.

In the exemplary arrangement, the current control device TR10 of demodulator 24 is in the form of an NPN transistor. The chroma information is transmitted from the band pass amplifier 20 to the base of demodulator transistor TR10 through the series arrangement of capacitor C6 and a gain setting resistor R12. The bias for the base is developed across resistor R13 connected between the base and ground. The emitter of transistor TR10 is connected to ground through a resistor R14, whereas the collector is connected to a conventional color matrix (not shown) including color difference amplifiers through a low-pass filter network (not shown) which removes the 3.58 mc. color subcarrier. The collector is also connected to the base through resistor R15 which provides bias current and a heavy feedback path resulting in the demodulation transistor TR10 being forward biased to function in its linear range.

The oscillator output converter or waveshaper TR11 is also shown in the form of an NPN transistor. The oscillator output, which is 180° out of phase with one of the color axes, is transmitted from the collector of the output amplifier TR7 to the base of the waveshaper transistor TR11 through the series arrangement of the primary winding circuitry of a critically coupled transformer 36, which phase shifts to oscillator output 180°, and a current limiting resistor R16. On the other hand, the oscillator output is transmitted to the base of the waveshaper transistor TR11' in the demodulator 26 through the critically coupled transformer 36, which shifts the phase of the oscillator output to correspond to the phase of the other color axis, and through a current-limiting resistor R16'. The phase shifting circuitry is conventional and will not be discussed in detail. The waveshaping transistor TR11 has its emitter grounded and its collector connected to the base of demodulation transistor TR10. The waveshaping transistor TR11 receives a sinusoidal signal from the oscillator output and is designed to produce an alternating output signal of constant area, such as a square wave output, by alternately being switched between saturation and cutoff. The alternating constant area output signal is applied to the base of the demodulation transistor.

Figure 3:
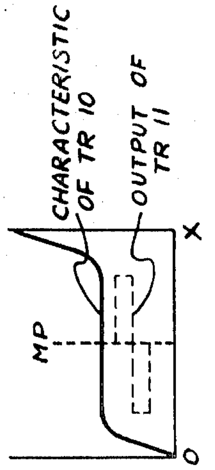
FIG. 3 shows a graph which illustrates the operation of the demodulator of FIG. 2.

Operation of the demodulation circuit 24 will be discussed in conjunction with FIG. 3 which illustrates the characteristic of the demodulation transistor TR10 in the solid line curve and illustrates the output of the waveshaping transistor TR11 in the dotted line square wave. The transistor TR10 is biased to normally be at substantially the midpoint MP of the linear portion of its characteristic. During positive half cycles of the oscillator output, the waveshaping transistor TR11 is driven to saturation so that the demodulation transistor TR10 is cut off and is at the high voltage end of its characteristic curve. Conversely, during negative half cycles of the oscillator output, the waveshaping transistor TR11 is cut off causing the demodulation transistor TR10 to be saturated and at the low voltage end of its characteristic curve. With this arrangement, the demodulation transistor TR10 functions in the linear portion of its characteristic curve and demodulates the chroma information at a desired phase angle relative to the phase angle of the oscillator output to produce a desired color difference signal. A different desired color difference signal is demodulated by the demodulation transistor TR10′ since it is rendered operative at a different phase angle because of the oscillator output phase shifting occurring in the phase shift network 36.

As previously indicated, one aspect of the invention is to incorporate portions of the oscillator and demodulation circuitry in an integrated circuit. In the exemplary arrangement, the portions encompassed by the dotted line 40 are intended to be incorporated on a single wafer of semiconductor material. It will be apparent, however, that the oscillator circuitry and the demodulation circuitry may be independently incorporated on separate wafers of semiconductor material. In keeping with this aspect of the invention, the potentiometer P1 may be incorporated for adjusting the DC bias applied to the phase detector 28B to compensate for differences in the characteristics between different integrated circuits. Additionally, the diodes D6—D11 will respond to temperature changes in the integrated circuit to alter the various bias voltages correspondingly to compensate for changes in the integrated circuit characteristics resulting from such temperature changes. In further keeping with this aspect of the invention, the diode switch D5 is a collector to substrate diode inherent within the integrated circuit.

Figure 4:
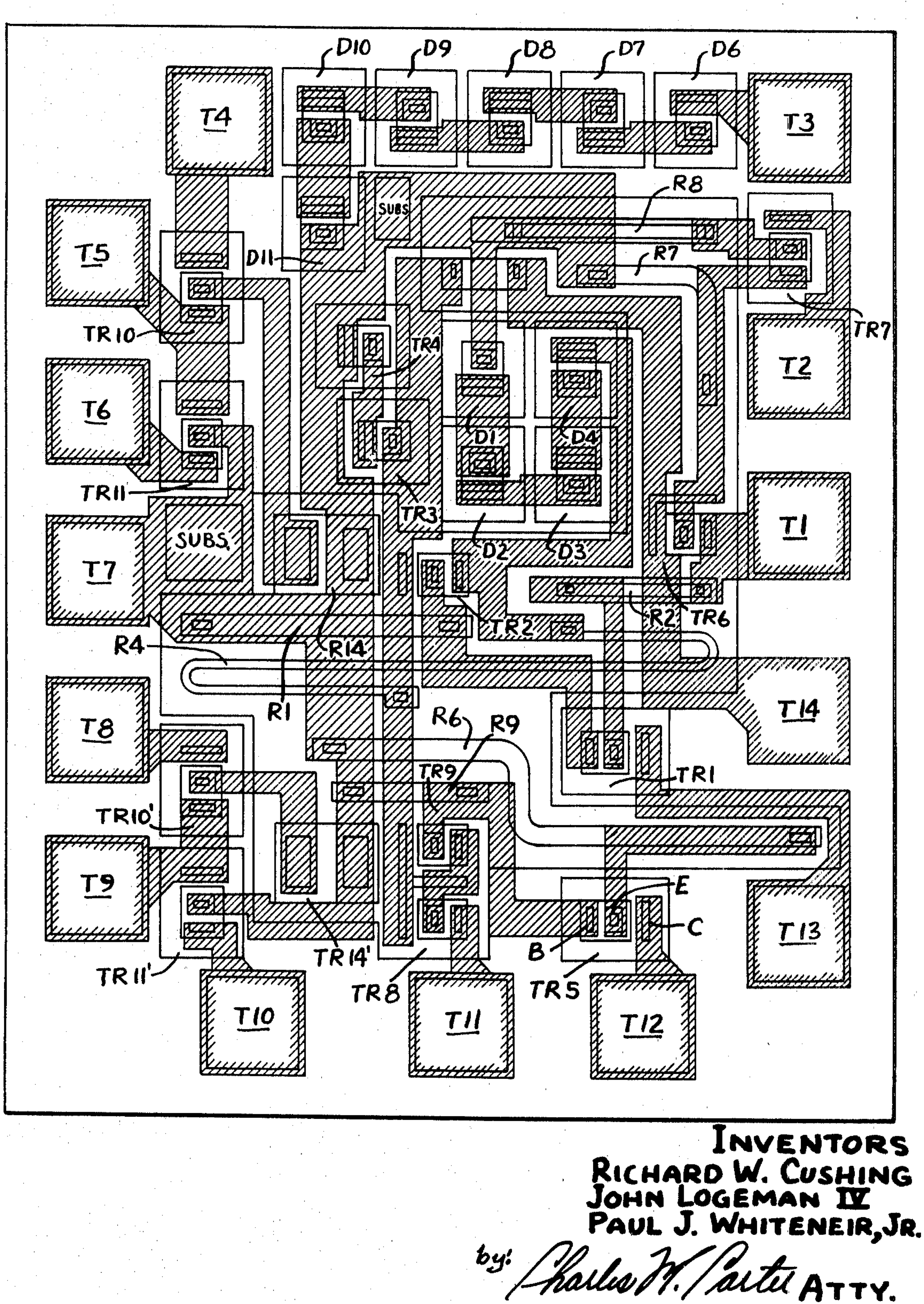
FIG. 4 is an enlarged plan view of an integrated circuit chip incorporating the circuit of FIG. 2.

Referring now to FIG. 4, an enlarged plan view of an integrated circuit chip is shown which incorporates the circuitry of FIG. 2 encompassed within the dotted line 40. The crosshatched areas represent metallized conductors and the other lined areas represent junctions between differing conductivity types of semiconductor material and also represent the boundaries of different isolation regions. To electrically isolate one area, i.e. one portion of the circuit on the chip, from another, a diffusion step is taken in the manufacture of the chip so that various islands of one conductivity type are separated one from the other by semiconductor material of an opposite conductivity type. The manufacturing process will follow that known in the integrated circuit art and does not constitute a portion of the present invention. Accordingly, details relative thereto will not be set forth.

As shown in FIGS. 2 and 4, the exemplary unit has fourteen terminals designated T1—T14. Terminal T7 is a substate, grounded terminal for all ground points within the chip. The number of terminals is a limiting factor in integrated circuits and accordingly must play an important part in any integrated circuit design. Every effort must be made to limit the number of external components so as to limit the number of required terminals. Since inductors can not be integrated, every effort must be made to limit their use. Various other factors must also be considered as previously discussed.

The various elements within the chip 40 and previously discussed as designated in FIG. 2 are similarly designated in FIG. 4. However, as may be seen the switch diode D5 is not designated in FIG. 4 but rather the collector of transistor TR5 (designated C) is connected only to terminal T12. The emitter of transistor TR5 is designated E and the base is designated B. As previously indicated, one portion of the present invention resides in the utilization of the inherent collector substrate diode of the chip for the switch diode D5. Thus, the collector-substrate diode inherent within the chip at terminal T12 functions as the switch diode D5. This eliminates the need for the integration of an additional element within the chip and thus allows for integration of the desired circuitry within the illustrated package. Additionally, in the exemplary arrangement of FIG. 4, the Zener diodes TR3,TR4 are formed by open circuiting the collectors and connecting the base-emitter circuits in series.

In view of the foregoing, it will be seen that new and improved chroma channel circuitry for a color television receiver has been provided. More specifically, a new and improved oscillator circuit and a new and improved demodulator circuit have been provided which lend themselves jointly or separately to integration on a single wafer of semiconductor material. As is apparent, the oscillator circuit also lends itself to use outside of a color television receiver.

We claim:

1. In a wave signal receiver for receiving color television signals, which signals include a modulated chroma subcarrier and reference frequency color bursts, said wave signal receiver including detector means for generating a control signal proportional to the phase difference between said reference bursts and a locally generated reference signal, the improvement comprising:

a readily integrable circuit for demodulating said chroma signal, said circuit comprising;

an oscillator for producing said reference signal, said oscillator including an active element and a resonant circuit, said resonant circuit further including an auxiliary capacitor for determining the frequency of operation of said oscillator;

reactance control means coupled to said auxiliary capacitor and responsive to said control signal for varying the frequency of said oscillator, said reactance control means including the parallel combination of the emitter-collector path of a first transistor and a diode, each poled to conduct in opposite directions, said parallel combination being coupled in parallel with said auxiliary capacitor, said diode being operative to periodically short circuit said capacitor, the forward conduction time of said diode during each oscillation cycle being proportional to the R-C time constant of the parallel combination of said emitter to collector path and said auxiliary capacitor;

first high-input impedance transistor amplifier means for coupling said control signal to the base of said first transistor to thereby continuously control the forward conduction time of said diode during each cycle of oscillation of said oscillator to maintain the frequency of said oscillator constant;

second DC transistor amplifier means having a low output impedance at the frequency of said oscillator for coupling a first source of bias potential to the active element of said oscillator, demodulator means for demodulating said chroma subcarrier signal;

an output transistor amplifier stage biased to provide collector current during approximately 180° or less of the signal from said oscillator for coupling the output of said oscillator to said demodulator means, said demodulator means including a pair of first and second solid state current control devices having amplification characteristics, input and output electrodes and a linear range of amplification, means for biasing each current control device to be substantially at the midpoint of its linear operating range, first and second solid state wave shaping means responsive to different phases of said reference signal for coupling said different phases of said reference signal to the inputs of respective ones of said current control devices, said wave shaping means being operative to produce substantially constant area square wave demodulating signals and, means coupling said chroma subcarrier signal to the inputs of said first and second current control devices, said current control devices thereby functioning to produce at the output thereof the information modulated on said chroma subcarrier at said respective phases.

2. The apparatus of claim 1 further comprising a second source of bias potential and potentiometer means for coupling a variable amount of said bias potential through said detector means to said first transistor amplifier to establish the operating point of said first transistor amplifier and said first transistor, adjustment of said potentiometer thereby being effective to vary the frequency to which said oscillator is set.

3. The apparatus of claim 2 wherein said source of bias potential includes a plurality of forward biased PN junctions to provide temperature compensation for said first transistor amplifier and said first transistor in said reactance control means.

4. The apparatus of claim 3 further comprising impedance means coupled between the collector of said first transistor and the input of said first transistor amplifier to provide negative feedback to further stabilize against transistor characteristic variations.

5. The apparatus of claim 1 wherein said second transistor amplifier means comprises a second transistor having its collector and base electrodes coupled to said first source of bias potential and the emitter coupled to a reference potential through an impedance element, and a plurality of forward biased PN junctions coupled between the base electrode and said reference potential, the emitter of said transistor being coupled to the active element of said oscillator.

6. The apparatus of claim 5 wherein said oscillator is a transistorized crystal controlled Hartly oscillator.

7. The apparatus of claim 1 wherein said reactance control device, first and second sources of bias potential, first and second transistor amplifiers, said oscillator active element, output transistor amplifier, first and second current control devices, and first and second wave shaping means are on all included on single wafer of semiconductor material.

8. The apparatus of claim 1 wherein said output amplifier stage is biased to produce collector current during substantially less than 180° of the signal from said oscillator.

9. In an oscillator having an active element: a resonant circuit for determining the oscillator frequency by the average capacitance thereof and including an auxiliary capacitor; switch means connected in parallel with the capacitor and alternately operative to render the capacitor electrically in the resonant circuit and to short circuit the capacitor; a transistor functioning as controllable constant current source connected in parallel with the switch means and responsive to a variable DC control signal for varying the R-C time constant of the parallel combination of said auxiliary capacitor and said transistor for controlling the duty cycle of the switch means within each cycle of oscillation of said oscillator to determine the average capacitance of the resonant circuit; and means for applying said variable DC control signal to said transistor, said transistor, said switch means and the active element of said oscillator being incorporated as an integrated circuit on a single wafer of semiconductor material said switch comprising the collector-substrate diode of said transistor which is inherent within the integrated circuit.